US012216419B2

(12) United States Patent
Ishida

(10) Patent No.: US 12,216,419 B2
(45) Date of Patent: Feb. 4, 2025

(54) FIXING DEVICE AND IMAGE FORMING APPARATUS

(71) Applicant: BROTHER KOGYO KABUSHIKI KAISHA, Nagoya (JP)

(72) Inventor: Kei Ishida, Inuyama (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/045,923

(22) Filed: Oct. 12, 2022

(65) Prior Publication Data

US 2023/0123984 A1 Apr. 20, 2023

(30) Foreign Application Priority Data

Oct. 15, 2021 (JP) ................................ 2021-169878

(51) Int. Cl.
*G03G 15/20* (2006.01)

(52) U.S. Cl.
CPC ................................ *G03G 15/2039* (2013.01)

(58) Field of Classification Search
CPC ................................................. G03G 15/2039
See application file for complete search history.

(56) References Cited

U.S. PATENT DOCUMENTS

2011/0299868 A1* 12/2011 Ito ...................... G03G 15/2039 399/88
2013/0121712 A1* 5/2013 Kaji .................. G03G 15/2046 399/45
2013/0279932 A1* 10/2013 Ishigai .............. G03G 15/2042 399/69
2018/0032009 A1* 2/2018 Ogura ................ G03G 15/2028
2018/0335731 A1 11/2018 Ogura
2020/0089148 A1* 3/2020 Kondo ................. G03G 15/607

FOREIGN PATENT DOCUMENTS

JP 2002-169413 A 6/2002
JP 2015-166795 A 9/2015
JP 2018-136392 A 8/2018
JP 2018-194686 A 12/2018

* cited by examiner

*Primary Examiner* — Stephanie E Bloss
*Assistant Examiner* — Michael A Harrison
(74) *Attorney, Agent, or Firm* — Merchant & Gould P.C.

(57) ABSTRACT

A fixing device includes a heater including a substrate and a resistance heating element disposed on the substrate, an endless belt, a first temperature sensor disposed at a position opposed to the heater and configured to detect a temperature at a center part of the heater in a longitudinal direction of the heater; and a second temperature sensor disposed at a position opposed to the heater and configured to detect a temperature at an end part of the heater in the longitudinal direction of the heater. The second temperature sensor is disposed at a position located on an outer side of the resistance heating element in the longitudinal direction of the heater.

18 Claims, 9 Drawing Sheets

FIXING DEVICE AND IMAGE FORMING APPARATUS

REFERENCE TO RELATED APPLICATIONS

The present application claims priority from Japanese Patent Application No. 2021-169878, which was filed on Oct. 15, 2021, the disclosure of which is herein incorporated by reference in its entirety.

BACKGROUND ART

The following disclosure relates to a fixing device and an image forming apparatus.

There has been known a conventional image forming apparatus, such as an electrophotographic type printer, including a fixing device configured to fix a developer image by heating a sheet on which the image is formed. The fixing device normally includes a heater having a resistance heating element, and a temperature sensor configured to detect a temperature of the heater. The fixing device controls a fixing temperature by the heater based on a detected result of the temperature sensor. Moreover, in the conventional fixing device, it has been suggested that two thermistors, which are temperature sensors, are provided at positions respectively opposed to a central part of the resistance heating element and an end part of the resistance heating element in a longitudinal direction of the heater so as to heat a sheet with a minimum width and a sheet with a maximum width usable in the fixing device.

DESCRIPTION

In the conventional fixing device, however, there is a possibility that the fixing temperature in a fixing operation cannot be detected with high accuracy when a high speed printing is executed. Specifically, in the conventional fixing device, since it is hard to suppress a situation in which the temperature detected by the temperature sensor disposed at the end part of the resistance heating element becomes a high temperature in the high speed printing for the sheets with the minimum width, there is a possibility that the fixing temperature in fixing operation cannot be detected with high accuracy when the high speed printing for the sheets with the minimum width is executed.

An aspect of the disclosure relates to a fixing device and an image forming apparatus capable of detecting a fixing temperature in a fixing operation with high accuracy even when a high speed printing is executed.

In one aspect of the disclosure, a fixing device includes a heater including a substrate and a resistance heating element disposed on the substrate, an endless belt configured to rotate around the heater, a first temperature sensor disposed at a position opposed to the heater and configured to detect a temperature at a center part of the heater in a longitudinal direction of the heater; and a second temperature sensor disposed at a position opposed to the heater and configured to detect a temperature at an end part of the heater in the longitudinal direction of the heater. The second temperature sensor is disposed at a position located on an outer side of the resistance heating element in the longitudinal direction of the heater.

In another aspect of the disclosure, an image forming apparatus comprises a fixing device. The fixing device includes a heater including a substrate and a resistance heating element disposed on the substrate, an endless belt configured to rotate around the heater, a first temperature sensor disposed at a position opposed to the heater and configured to detect a temperature at a center part of the heater in a longitudinal direction of the heater, and a second temperature sensor disposed at a position opposed to the heater and configured to detect a temperature at an end part of the heater in the longitudinal direction of the heater. The second temperature sensor is disposed at a position located on an outer side of the resistance heating element in the longitudinal direction of the heater.

The objects, features, advantages, and technical and industrial significance of the present disclosure will be better understood by reading the following detailed description of the embodiments, when considered in connection with the accompanying drawings, in which.

FIRST EMBODIMENT

There will be described below a first embodiment of the present disclosure in detail with reference to FIG. 1 to FIG. 6. In the present embodiment, there will be described a laser printer configured to form an image on a sheet S1 by using toner as an example of an image forming apparatus 1.

Configuration of Image Forming Apparatus

Figure 1:
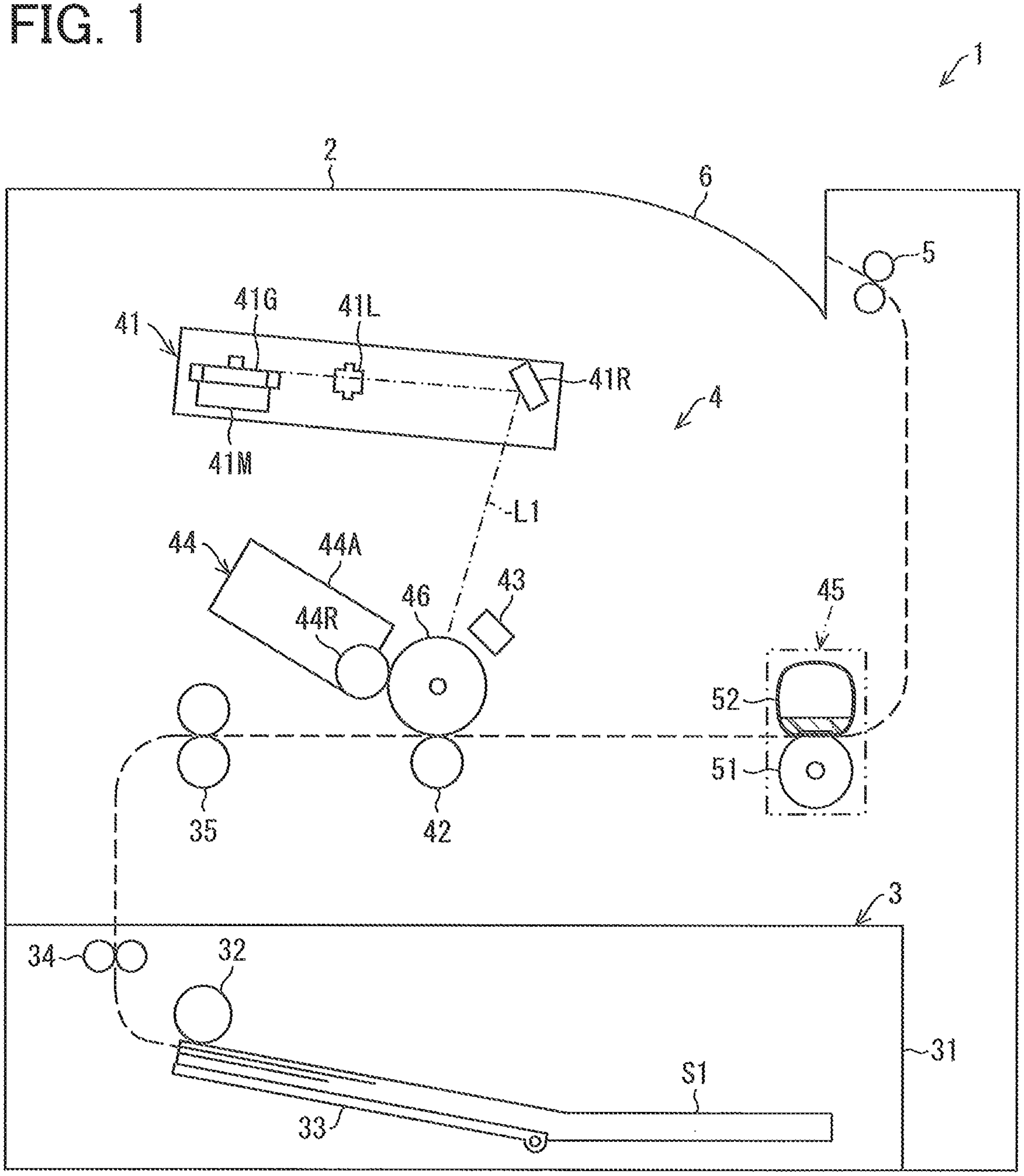
FIG. 1 is a view for explaining an overview of a configuration of an image forming apparatus of the present disclosure.

FIG. 1 is a view for explaining an overview of a configuration of the image forming apparatus 1 of the first embodiment of the present disclosure. It is noted that there will be exemplified below a monochrome printer configured to execute an image forming process of monochrome images as the image forming apparatus 1, however, the present embodiment is not limited to this. The image forming apparatus 1 may be, for example, a color printer configured to execute an image forming process of full-color images.

As illustrated in FIG. 1, the image forming apparatus 1 includes a housing 2, a sheet-supplier 3, an image forming unit 4, a discharging roller 5 and a discharge tray 6. As illustrated in FIG. 1, the housing 2 is configured as an external container of the image forming apparatus 1, and the housing 2 contains a main configuration of the image forming apparatus 1.

As illustrated in FIG. 1, the sheet-supplier 3 supplies a sheet S1. The sheet-supplier 3 includes a sheet-supply tray 31, a sheet supplying roller 32, a pressing plate 33, a conveying roller 34 and a registration roller 35. The sheet-supply tray 31 is a member shaped like a box opening upward, and the sheet-supply tray 31 accommodates a predetermined number of sheets S1. Moreover, the sheet S1 is a recording medium for which the image forming process is executed, and the sheet S1 is made of paper, plastic and so on.

The sheet supplying roller 32 conveys the sheet S1 accommodated in the sheet-supply tray 31. That is, when the sheet S1 is fed from the sheet-supply tray 31, the sheet S1 placed on the sheet-supply tray 31 is pushed toward the sheet supplying roller 32 by the pressing plate 33, and fed to the conveying roller 34 in accordance with rotation of the sheet supplying roller 32. The conveying roller 34 conveys the sheet S1 toward the registration roller 35. The registration roller 35 conveys the sheet S to the image forming unit 4 after aligning positions of leading edges of the sheet S.

The image forming unit 4 forms an image on the sheet S1 fed by the sheet-supplier 3 by executing the image forming process. As illustrated in FIG. 1, the image forming unit 4 includes an exposing unit 41, a transfer unit 42, a charging unit 43, a developing unit 44, a fixing device 45 of the present disclosure and a photoconductive drum 46. The exposing unit 41 includes a laser light source, which is not illustrated, a polygon mirror 41G, a scanning lens 41L, a polygon motor 41M and a reflector 41R.

The polygon mirror 41G is a polygon mirror having a regular hexagonal prism shape, side walls of which are six reflecting surfaces. The polygon mirror 41G is for deflecting light beam L1 emitted from the laser light source to a direction directed toward the photoconductive drum 46. The polygon motor 41M rotates and drives the polygon mirror 41G by being driven by a motor driver, which is not illustrated.

The exposing unit 41 deflects the light beam L1 by the polygon mirror 41G such that the light beam L1 is emitted toward a surface of the photoconductive drum 46 via the polygon mirror 41G, the scanning lens 41L and the reflector 41R. The exposing unit 41 exposes the photoconductive drum 46 by scanning the surface of the photoconductive drum 46 by the light beam L1. As a result of this, an electrostatic latent image is formed on the photoconductive drum 46. The electrostatic latent image constitutes a toner image, which will be described below. The polygon motor 41M is, for example, a brushless DC motor.

The transfer unit 42 includes a transfer roller that cooperates with the photoconductive drum 46 to nip the sheet S1 therebetween, and the transfer unit 42 transfers the toner image from the photoconductive drum 46 to the sheet S1. The charging unit 43 includes, for example, a scorotron type charging unit having a charging wire and a grid portion, which are not illustrated. In the charging unit 43, a charging voltage generated by a high voltage generating circuit, which is not illustrated, is applied to the charging wire, and a grid voltage generated by the high voltage generating circuit is applied to the grid portion. As a result, a corona discharge occurs in the charging unit 43, and the surface of the photoconductive drum 46 is charged with uniformity. The developing unit 44 includes a developing roller 44R and a toner cartridge 44A containing developer such as toner.

It is noted that the present disclosure is not limited to the above described configuration, and the transfer unit 42 may include, for example, a transfer belt in place of the transfer roller. Moreover, the charging unit 43 may include, for example, a charging roller in place of the scorotron type charging unit.

In the image forming unit 4, after the charging unit 43 charges the surface of the photoconductive drum 46 with uniformity, the electrostatic latent image is formed on the surface of the photoconductive drum 46 by the light beam L1 from the exposing unit 41 based on printing data. Moreover, the developing roller 44R supplies toner to the surface of the photoconductive drum 46 on which the electrostatic latent image is formed from the toner cartridge 44A. As a result of this, the electrostatic latent image becomes a visible image, and the toner image is formed on the surface of the photoconductive drum 46. Then, the toner image formed on the surface of the photoconductive drum 46 is transferred to the sheet S1 when the sheet S1 supplied from the sheet-supplier 3 is conveyed to a transfer position which is a position located between the photoconductive drum 46 and the transfer unit 42.

The sheet S1 to which the toner image is transferred is conveyed to the fixing device 45 by the photoconductive drum 46 and the transfer unit 42. The fixing device 45 fixes the toner image formed on the sheet S1 onto the sheet S1. Specifically, the fixing device 45 heat-fixes the toner image formed on the sheet S1 which is conveyed from the photoconductive drum 46 and the transfer unit 42 by using heat generated by a heater 60. The sheet S1 onto which the toner image is heat-fixed is discharged to the discharge tray 6 by the discharging roller 5.

The fixing device 45 includes a pressure roller 51 configured to press the sheet S1 on which the toner image is formed and a heating unit 52 configured to heat the sheet S1 in a state in which the heating unit 52 is in contact with the sheet S1. One of the pressure roller 51 and the heating unit 52 is pressed toward the other of the pressure roller 51 and the heating unit 52 by a pressing unit, which is not illustrated. Accordingly, when the pressing unit is controlled by instructions from a controller, which is not illustrated, a fixing operation of the toner image for the sheet S1 is executed in the fixing device 45 in a state in which a predetermined pressure is applied between the pressure roller 51 and the heating unit 52.

The pressure roller 51 rotates and drives in a clockwise direction in FIG. 1 based on instructions from the controller. That is, the pressure roller 51 rotates in a state in which the pressure roller 51 cooperates with a belt 53, which will be described below, provided for the heating unit 52 to nip the sheet S1, which is conveyed toward the discharge tray 6, therebetween. In this situation, the belt 53 is configured to be driven to rotate in a predetermined rotation direction, which is a direction illustrated by an arrow R in FIG. 4, by friction force among the pressure roller 51, the belt 53 and the sheet S1. As a result of this, in the fixing device 45, the toner image is heat-fixed onto the sheet S1 when the sheet S1 on which the toner image is transferred is conveyed to a position between the pressure roller 51 and the heating unit 52.

Configuration of Heating Unit

Figure 2A:
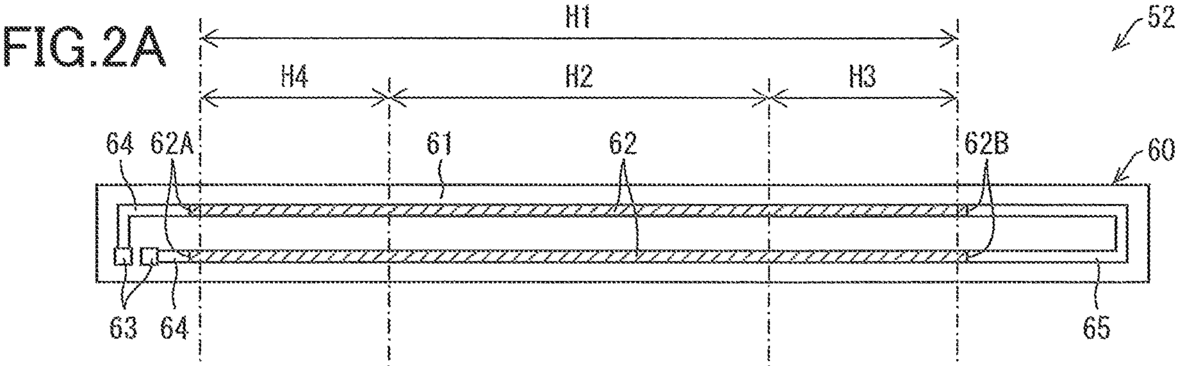
FIG. 2A is a plan view illustrating a heater of a heating unit provided for a fixing device of the present disclosure.
Figure 2B:
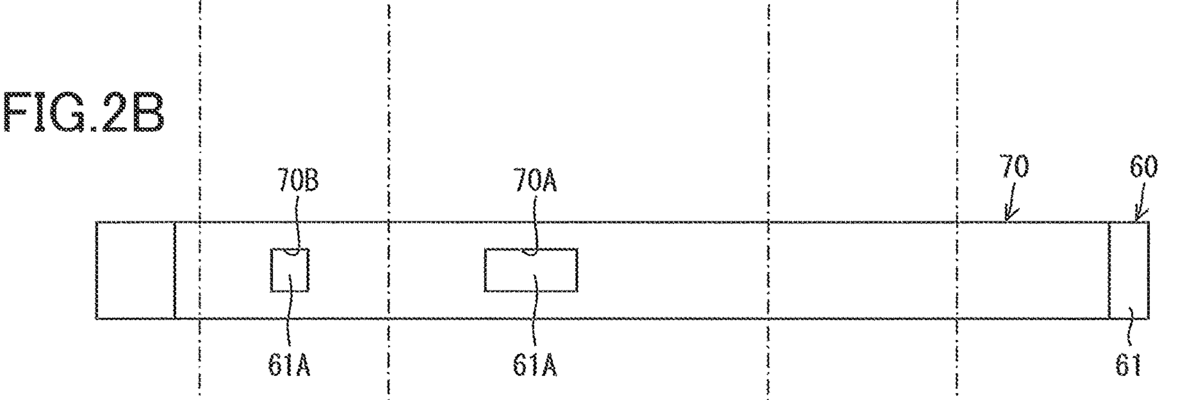
FIG. 2B is a plan view illustrating a metal sheet of the heating unit.
Figure 2C:
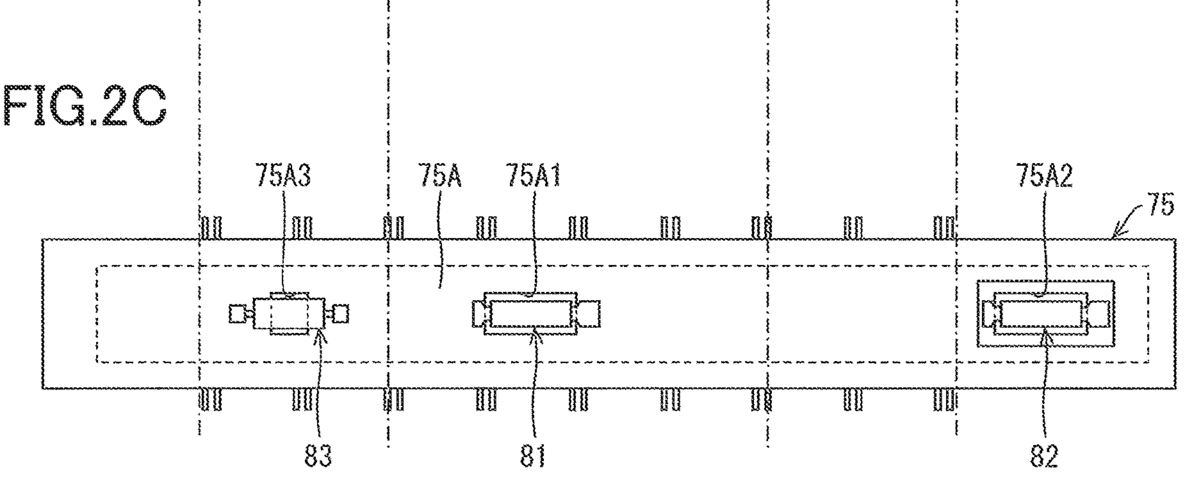
FIG. 2C is a plan view illustrating a first temperature sensor, a second temperature sensor and a thermostat of the heating unit.
Figure 3A:
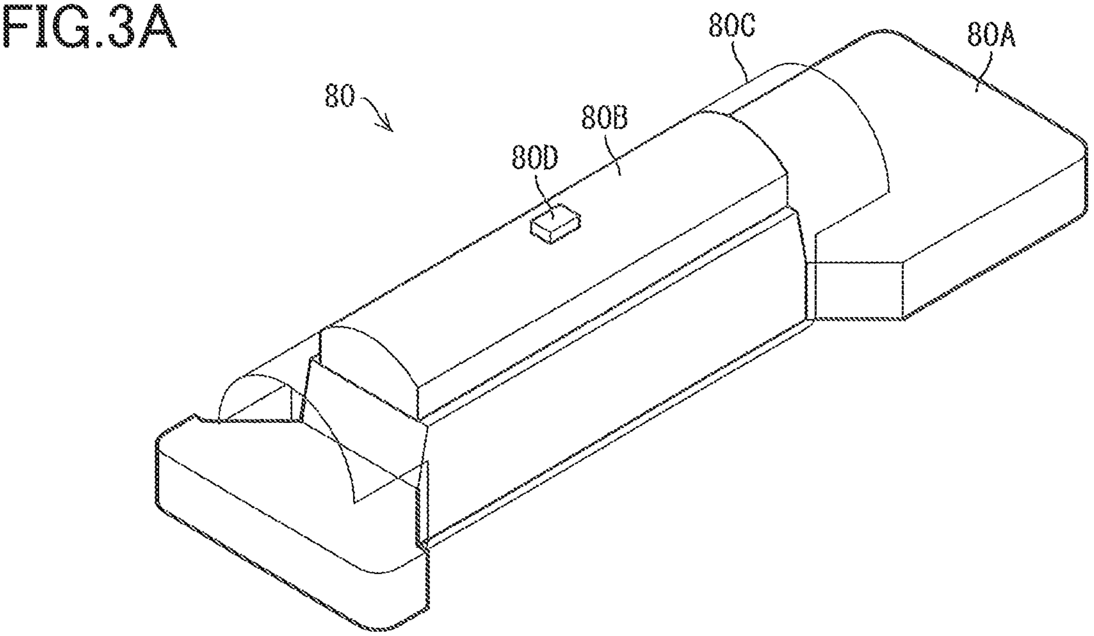
FIG. 3A is a perspective view illustrating the first temperature sensor and the second temperature sensor.
Figure 3B:
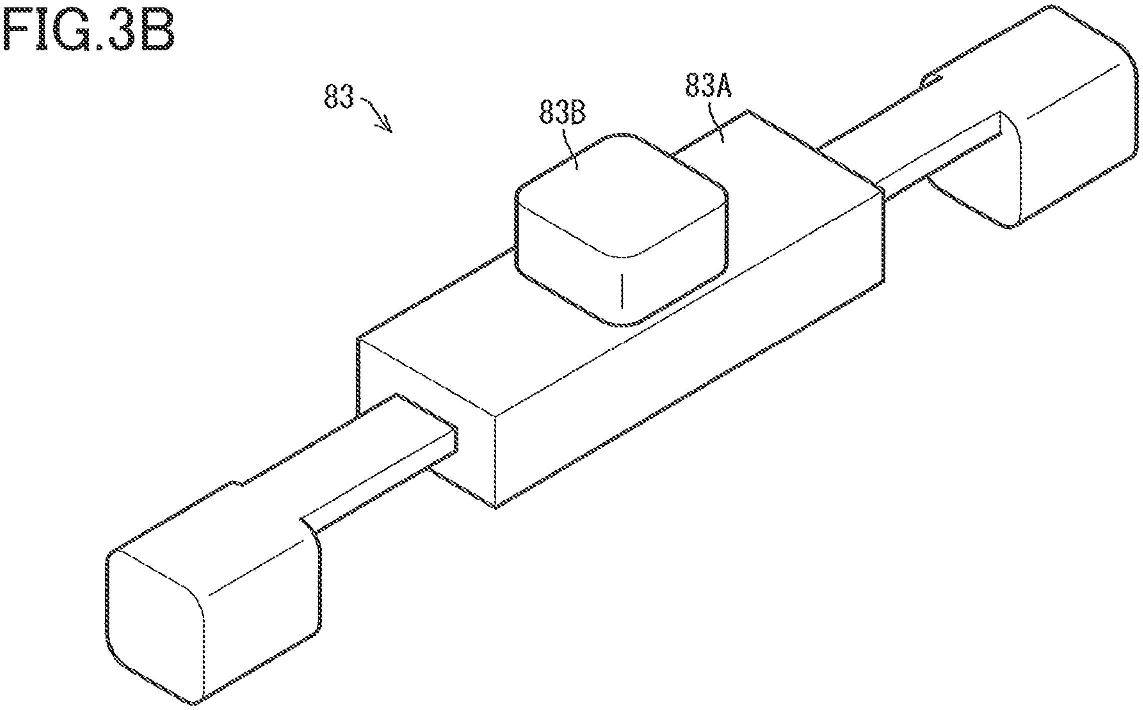
FIG. 3B is a perspective view illustrating the thermostat.
Figure 4:
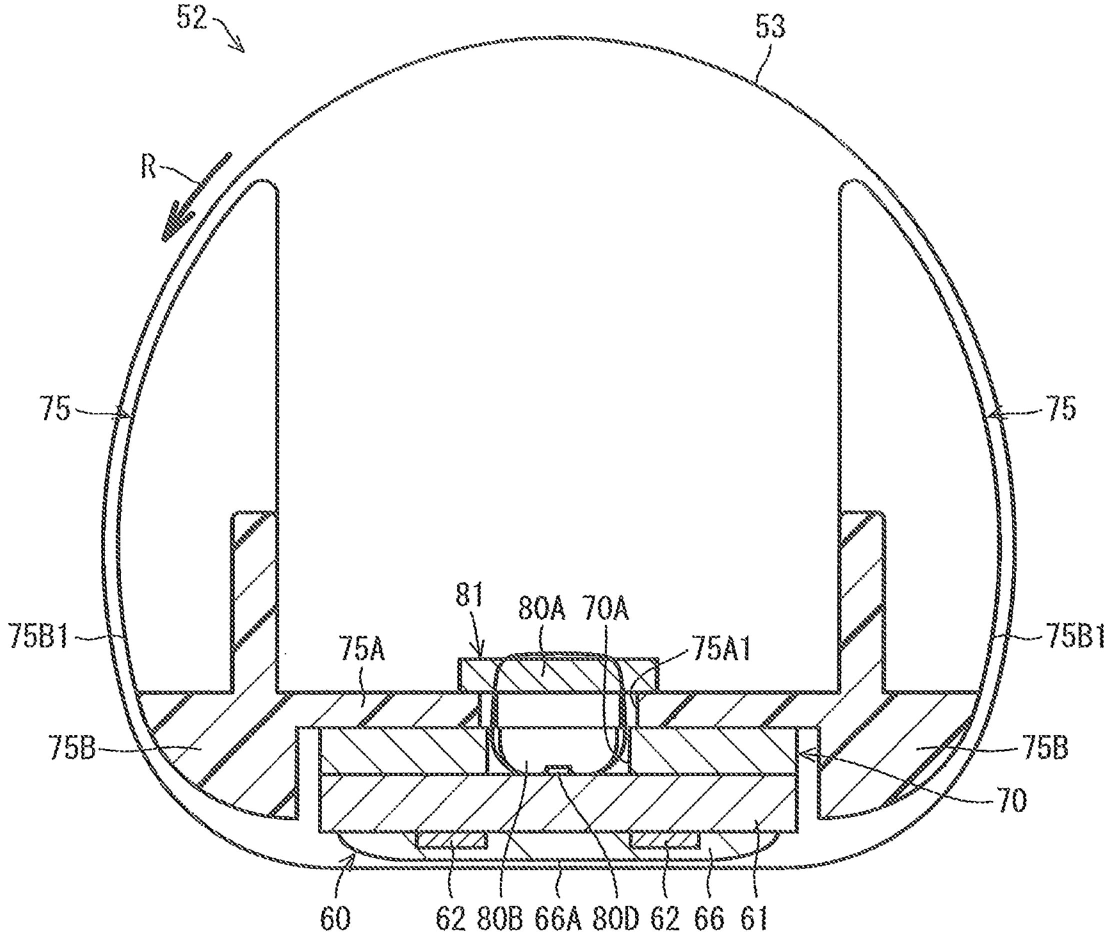
FIG. 4 is a cross sectional view illustrating the first temperature sensor of the heating unit.
Figure 5:
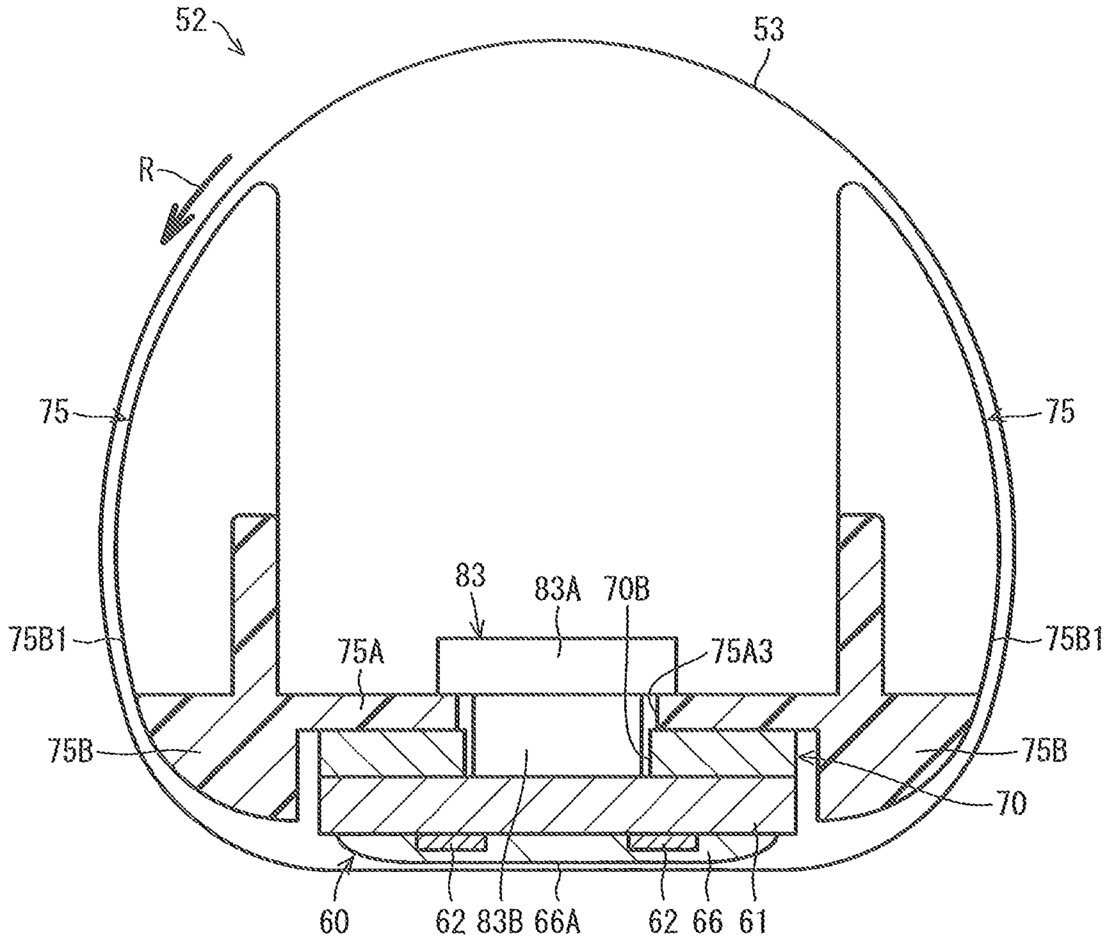
FIG. 5 is a cross sectional view illustrating the thermostat of the heating unit.
Figure 6:
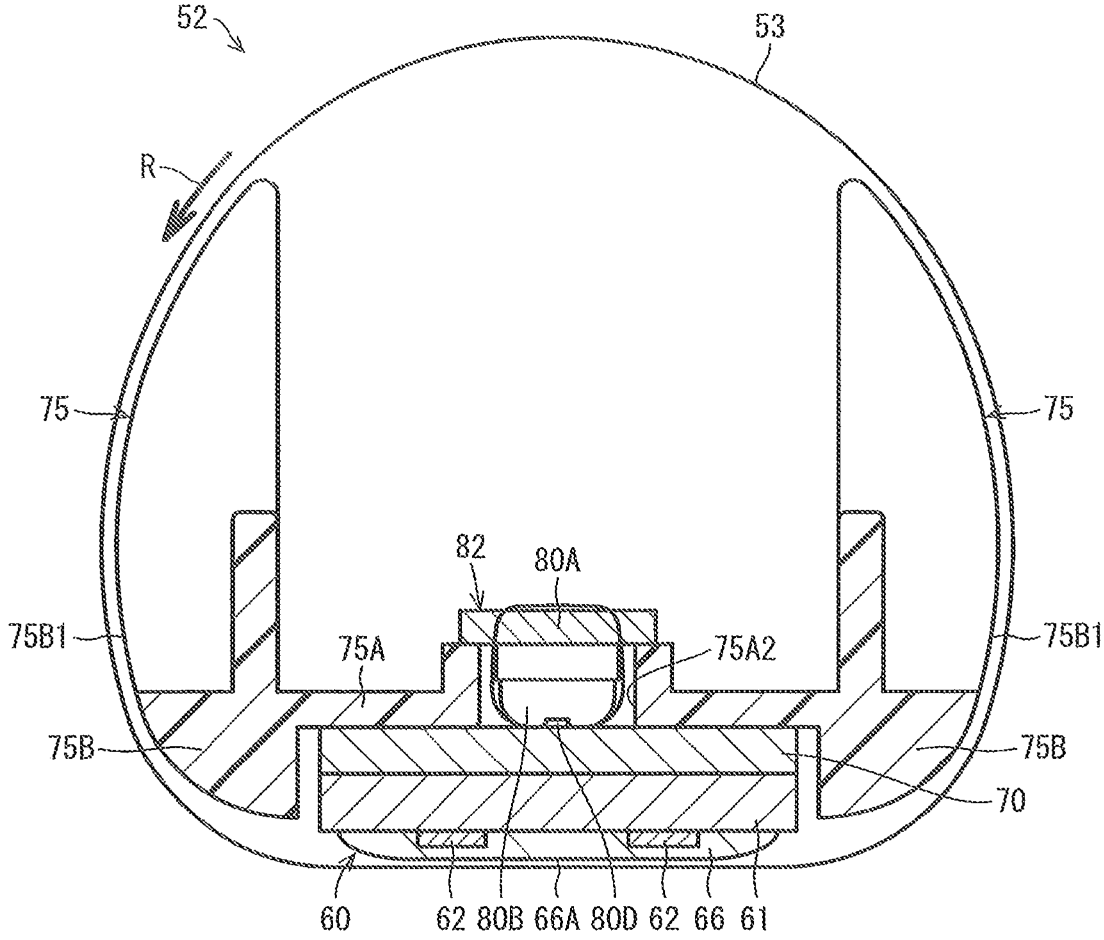
FIG. 6 is a cross sectional view illustrating the second temperature sensor of the heating unit.

Here, there will be specifically described the heating unit 52 of the present embodiment with reference to FIG. 2A to FIG. 6. FIG. 2A is a plan view illustrating the heater 60 of the heating unit 52 provided for the fixing device 45 of the present disclosure. FIG. 2B is a plan view illustrating a metal sheet 70 of the heating unit 52, and FIG. 2C is a plan view illustrating a first temperature sensor 81, a second temperature sensor 82 and a thermostat 83 of the heating unit 52. FIG. 3A is a perspective view illustrating the first temperature sensor 81 and the second temperature sensor 82, and FIG. 3B is a perspective view illustrating the thermostat 83. FIG. 4 is a cross sectional view illustrating the first temperature sensor 81 of the heating unit 52. FIG. 5 is a cross sectional view illustrating the thermostat 83 of the heating unit 52. FIG. 6 is a cross sectional view illustrating the second temperature sensor 82 of the heating unit 52.

As illustrated in FIG. 2A to FIG. 2C, the heating unit 52 of the present embodiment includes the heater 60, a holder 75 supporting the heater 60 and the metal sheet 70 disposed between the heater 60 and the holder 75. The heater 60 a heat-applying member having a rectangular shape in plan view, and the heater 60 includes a substrate 61 and resistance heating elements 62 disposed on the substrate 61. The number of the resistance heating elements 62 is two, for example.

The substrate 61 is made of, for example, ceramic material. The two resistance heating elements 62 are formed on a first surface of the substrate 61 by, for example, a printing patterning method such that the two resistance heating elements 62 are parallel to each other. It is noted that the present disclosure is not limited to the above described configuration, and the substrate 61 may be made of metallic material such as stainless. In this case, the two resistance heating elements 62 are formed on the first surface of the substrate 61 in a state in which an insulating layer which is made of such as glass material is interposed between the two resistance heating elements 62 and the first surface of the substrate 61.

The resistance heating element 62 is made of, for example, electrically conductive material having high heat build-up property such as nickel-chrome alloy and iron-chrome alloy, for example. Moreover, a current-supply terminal 63 is connected to a first end 62A of the resistance heating element 62 via a conducting wire 64. Moreover, a conducting wire 65 is connected to a second end 62B of the resistance heating element 62, and the two resistance heating elements 62 are electrically conducting to each other via the conducting wire 65.

A connector, which is not illustrated, is connected to the current-supply terminal 63 attachably and detachably. Electric power is supplied to the resistance heating element 62 in a state in which a power source, which is not illustrated, is connected to the current-supply terminal 63 via the connector. Then, in the heater 60, the resistance heating element 62 is configured to generate heat based on an instruction from the controller. That is, an amount of current supplied to the resistance heating element 62 is controlled, moreover, the amount of heat generated by the resistance heating element 62 is increased and decreased, and the heat-applying from the heater 60 to the belt 53 is controlled.

Moreover, as illustrated in FIG. 2A, in the heater 60, a dimension of the resistance heating element 62 in a longitudinal direction of the heater 60 is greater than a maximum width H1 of the sheet S1 usable in the fixing device 45. Moreover, the fixing device 45 is configured such that toner images can be heat-fixed on a plurality of kinds of the sheets S respectively having various width dimensions. Specifically, the fixing operation is executed in the fixing device 45 in a state in which center positions in width directions of the plurality of kinds of the sheets S1 respectively having the various width dimensions are aligned with each other. For example, the sheet S1 having a minimum width H2 usable in the fixing device 45 is heated by a central part of the resistance heating element 62 in the longitudinal direction of the heater 60 in the fixing operation.

Moreover, in the fixing device 45, when the fixing operation is executed for the sheet S1 having the minimum width H2, an end area H3 and an end area H4 which are located outside the area of the minimum width H2 in the longitudinal direction of the heater 60 are not-passing-areas through which the sheet S1 having the minimum width H2 does not pass in the fixing operation. As a result of this, the heat in the end area H3 and the end area H4 is not lost by the sheet S1 having the minimum width H2 in the fixing operation, and the temperature of the heater 60 at the end area H3 or the end area H4 easily increases, when compared with the central part of the resistance heating element 62 in the longitudinal direction of the heater 60, that is the area of the minimum width H2.

Moreover, as illustrated in FIG. 5, the heater 60 includes a cover 66 disposed on the substrate 61 so as to cover the resistance heating element 62. The cover 66 is made of insulating material such as glass material, for example. Moreover, the cover 66 includes a nip surface 66A that is in contact with an inner circumferential surface of the belt 53.

The belt 53 is an endless belt having flexibility and a heat-resisting property. The belt 53 includes, for example, a base portion made of metallic material such as stainless, and an insulating layer made of synthetic resin such as fluororesin and configured to cover the base portion, which are not illustrated. The belt 53 is configured to rotate around the heater 60, the metal sheet 70, the holder 75, the first temperature sensor 81, the second temperature sensor 82 and the thermostat 83 in a state in which the heater 60, the metal sheet 70, the holder 75, the first temperature sensor 81, the second temperature sensor 82 and the thermostat 83 are located on an inner side of the belt 53.

Figure 8A:
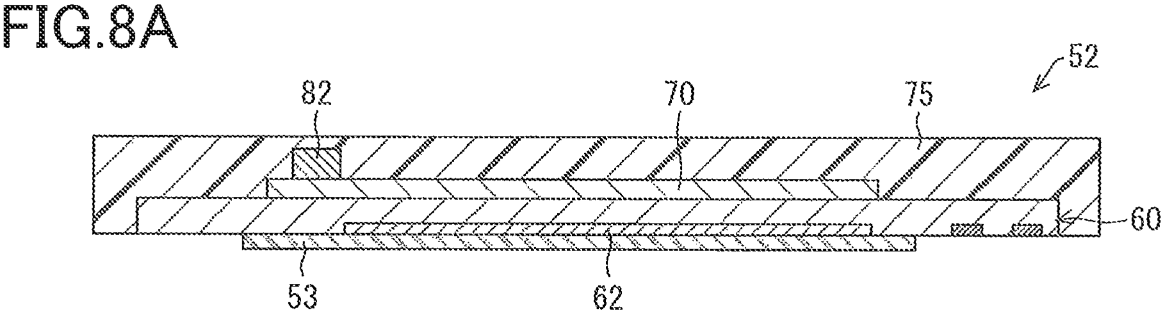
FIG. 8A is a side view illustrating a main configuration of the heating unit of the present disclosure.

Moreover, the inner circumferential surface of the belt 53 is in contact with the nip surface 66A of the heater 60, and the belt 53 is configured such that heat from the heater 60 is transferred to the sheet S1 via the belt 53. Moreover, as illustrated in FIG. 8A, a dimension of the longitudinal direction of the heater 60 is greater than a dimension of the resistance heating element 62 in the longitudinal direction of the heater 60.

The holder 75 is made of synthetic resin material, for example. Moreover, as illustrated in FIG. 2C, the holder 75 includes a support portion 75A supporting the heater 60. That is, the support portion 75A supports the substrate 61 of the heater 60 illustrated by a dotted line in FIG. 2C via the metal sheet 70 in a state in which the support portion 75A is in contact with the metal sheet 70. Moreover, as illustrated in FIG. 5, the holder 75 includes a guide portion 75B having a guide surface 75B1 that is in contact with the inner circumferential surface of the belt 53 and configured to guide the belt 53.

The metal sheet 70 is made of metallic material, the thermal conductivity of which is high, such as aluminum, aluminum alloy, and copper. The metal sheet 70 functions as a heat soaking plate configured to conduct heat in the longitudinal direction of the heater 60 so as to make the temperature of the heater 60 uniform in the longitudinal direction of the heater 60. It is noted that an anisotropic heat conductive member such as a graphite sheet may be used in place of the metal sheet 70. In a case where the anisotropic heat conductive member is used in place of the metal sheet 70, it is preferable that the heat conductivity of the anisotropic heat conductive member in a longitudinal direction of the anisotropic heat conductive member is greater than the heat conductivity in a thickness direction of the anisotropic heat conductive member.

Moreover, as illustrated in FIG. 2B, the metal sheet 70 is configured such that a dimension of the metal sheet 70 in the longitudinal direction of the heater 60 is greater than a dimension of an area which includes a whole of the maximum width H1 in the longitudinal direction of the heater 60. In other words, a first end of the metal sheet 70 is closer to a first end of the substrate 61 than a first end of the maximum width H1 in the longitudinal direction of the heater 60 and a second end of the metal sheet 70 is closer to a second end of the substrate 61 than a second end of the maximum width H1 in the longitudinal direction of the heater 60. That is, the metal sheet 70 extends such that the second end of the metal sheet 70 is closer to the second end of the substrate 61 than the second end 62B of the resistance heating element 62 in the longitudinal direction of the heater 60. As described in details below, the second temperature sensor 82 is in direct contact with an extended portion of, that is, a portion of the metal sheet 70 located between the second end of the metal sheet 70 and the second end 62B of the resistance heating element 62 in the longitudinal direction of the heater 60. The second temperature sensor 82 is configured to detect a temperature at the second end part of the heater 60 in the longitudinal direction of the heater 60, which is the portion of the metal sheet 70 located between the second end of the metal sheet 70 and the second end 62B of the resistance heating element 62.

Moreover, as described in details below, an opening 70A and an opening 70B are respectively formed at a central part and a first end part of the metal sheet 70 in the longitudinal direction of the heater 60. The first temperature sensor 81 is in direct contact with a back surface 61A of the substrate 61 through the opening 70A, and the thermostat 83 is in direct contact with the back surface 61A of the substrate 61 through the opening 70B.

Each of the first temperature sensor 81 and the second temperature sensor 82 is constituted by a thermistor, for example. It is noted that the first temperature sensor 81 and the second temperature sensor 82 are collectively called a temperature sensor 80 in the following description.

As illustrated in FIG. 3A, the temperature sensor 80 includes a base portion 80A, a protruding member 80B on which a temperature detecting element 80D is provided such that the temperature detecting element 80D protrudes upward, and a film 80C provided for the base portion 80A so as to cover the protruding member 80B. The protruding member 80B is made of, for example, elastic material such as sponge material, and the protruding member 80B is mounted on the base portion 80A. The temperature sensor 80 can accurately detect a temperature of a target to be detected by pressing the temperature detecting element 80D by the protruding member 80B in a state in which the temperature detecting element 80D is in certain contact with the target to be detected.

As illustrated in FIG. 2C, the first temperature sensor 81 is provided for the holder 75 such that the first temperature sensor 81 is located at a position within an area of the minimum width H2, and the first temperature sensor 81 detects a temperature at a central part of the heater 60 in the longitudinal direction of the heater 60. Specifically, as illustrated in FIG. 4, the first temperature sensor 81 detects the temperature at the central part of the heater 60 in the longitudinal direction of the heater 60 in a state in which the protruding member 80B passes through an opening 75A1 of the holder 75 and the opening 70A of the metal sheet 70 in this order such that the temperature detecting element 80D comes into contact with the back surface 61A of the substrate 61. Moreover, the first temperature sensor 81 is connected to the controller, and the controller executes a feedback control of the heater 60 by using a detected result of the first temperature sensor 81.

It is noted that the present disclosure is not limited to the above described configuration, and the first temperature sensor 81 may be in contact with the metal sheet 70 by causing the protruding member 80B to come into contact with a back surface of the metal sheet 70 without forming the opening 75A1 of the holder 75 and the opening 70A of the metal sheet 70.

As illustrated in FIG. 2C, the second temperature sensor 82 is provided for the holder 75 such that the second temperature sensor 82 is located at a position outside the area of the resistance heating element 62 in the longitudinal direction of the heater 60. That is, the second temperature sensor 82 is disposed at a position located between the second end of the substrate 61 in the longitudinal direction of the heater 60 and the second end of the resistance heating element 62 in the longitudinal direction of the heater 60. The second temperature sensor 82 may be disposed at a position located between the first end of the substrate 61 in the longitudinal direction of the heater 60 and the first end of the substrate 61 in the longitudinal direction of the heater 60. The second temperature sensor 82 detects a temperature at a second end part of the heater 60, which is closer to the second end of the substrate 61 than the first temperature sensor 81, in the longitudinal direction of the heater 60. Specifically, as illustrated in FIG. 6, the second temperature sensor 82 detects the temperature at the second end part of the heater 60 in the longitudinal direction of the heater 60 in a state in which the protruding member 80B passes through an opening 75A2 of the holder 75 such that the temperature detecting element 80D comes into contact with the back surface of the metal sheet 70. Moreover, the second temperature sensor 82 is connected to the controller, and the controller determines a degree of increase in temperature at the second end part of the heater 60 in the longitudinal direction of the heater 60 by using a detected result of the second temperature sensor 82.

The thermostat 83 interrupts energization to the resistance heating element 62 when the heater 60 is abnormally increased in temperature. Specifically, as illustrated in FIG. 3B, the thermostat 83 is constituted by, for example, a thermostat, and the thermostat 83 includes a container 83A and a temperature detecting portion 83B protruding upward from the container 83A and configured to detect a temperature. An interrupting mechanism using, for example, a bimetal, which is not illustrated, connected to the temperature detecting portion 83B is provided for the container 83A. The thermostat 83 interrupts energization to the resistance heating element 62, that is supply of electric power to the resistance heating element 62, when the temperature of the heater 60 increases to a temperature equal to or greater than a predetermined temperature.

Moreover, as illustrated in FIG. 2C, the thermostat 83 is provided for the holder 75 such that the thermostat 83 is located at a position within an area of an end area H4. The thermostat 83 detects a temperature at a first end part of the heater 60 in the longitudinal direction of the heater 60. Specifically, as illustrated in FIG. 5, the thermostat 83 detects the temperature at the first end part of the heater 60 in the longitudinal direction of the heater 60 in a state in which the temperature detecting portion 83B passes through an opening 75A3 of the holder 75 and the opening 70B of the metal sheet 70 in this order such that the temperature detecting portion 83B comes into contact with the back surface 61A of the substrate 61.

As described above, the fixing device 45, and the image forming apparatus 1 including the fixing device 45 according to the present embodiment includes the heater 60 having the resistance heating element 62 disposed on the substrate 61, the first temperature sensor 81 configured to detect the temperature at the central part of the heater 60 in the longitudinal direction of the heater 60, and the second temperature sensor 82 configured to detect the temperature at the second end part of the heater 60 closer to the second end of the substrate 61 than the first temperature sensor 81 in the longitudinal direction of the heater 60. The second temperature sensor 82 is disposed at the position located outside the area of the resistance heating element 62 in the longitudinal direction of the heater 60. As a result, in the present embodiment, since the second temperature sensor 82 detects the temperature of the heater 60 in a state in which the second temperature sensor 82 is located at the position outside the area of the resistance heating element 62 in the longitudinal direction of the heater 60, the second temperature sensor 82 can detect the temperature of the heater 60 without being affected by the excessive increase in temperature at the second end part of the heater 60 in the longitudinal direction of the heater 60, when compared with a case in which the second temperature sensor 82 is disposed at a position located within the area of the resistance heating element 62. As a result of this, in the present embodiment, it is possible to achieve the fixing device 45 and the image forming apparatus 1 capable of detecting the fixing temperature in the fixing operation accurately even when the speed of printing is increased.

Moreover, in the present embodiment, the fixing device 45 and the image forming apparatus 1 further includes the holder 75 supporting the heater 60 and the metal sheet 70 located between the heater 60 and the holder 75, and the second temperature sensor 82 is in contact with the metal sheet 70. As a result of this, in the present embodiment, the second temperature sensor 82 can detect the temperature of the heater 60 accurately and promptly via the metal sheet 70.

Moreover, in the present embodiment, as illustrated in FIG. 2A to FIG. 2C, the current-supply terminal 63 of the heater 60 is disposed at the first end part of the heater 60 in the longitudinal direction of the heater 60 and the second temperature sensor 82 is disposed at the second end part of the heater 60 in the longitudinal direction of the heater 60. In other words, the current-supply terminal 63 is disposed at a position located between the first end of the substrate 61 in the longitudinal direction of the heater 60 and the first end of the resistance heating element 62 in the longitudinal direction of the heater 60, and the second temperature sensor 82 is disposed at a position located between the second end of the substrate 61 in the longitudinal direction of the heater 60 and the second end of the resistance heating element 62 in the longitudinal direction of the heater 60. As a result of this, in the present embodiment, since the second temperature sensor 82 can be disposed at the second end part of the heater 60 without considering positions of the current-supply terminal 63 and electric wires connected to the current-supply terminal 63, it is possible to increase a degree of design flexibility of the second temperature sensor 82.

Moreover, in the present embodiment, the thermostat 83 is disposed at the first end part of the heater 60, which is closer to the first end of the substrate 61 than the second end of the substrate 61 in the longitudinal direction of the heater 60. In other words, the thermostat 83 is disposed at a position located between the first end of the substrate 61 in the longitudinal direction of the heater 60 and the first end of the resistance heating element 62 in the longitudinal direction of the heater 60. Accordingly, the thermostat 83 can detect the temperature at a first end part of the sheet S1 in a width direction of the sheet S1. Therefore, it is possible to interrupt the energization to the resistance heating element 62 when the heater 60 is abnormally increased in temperature.

Figure 7A:
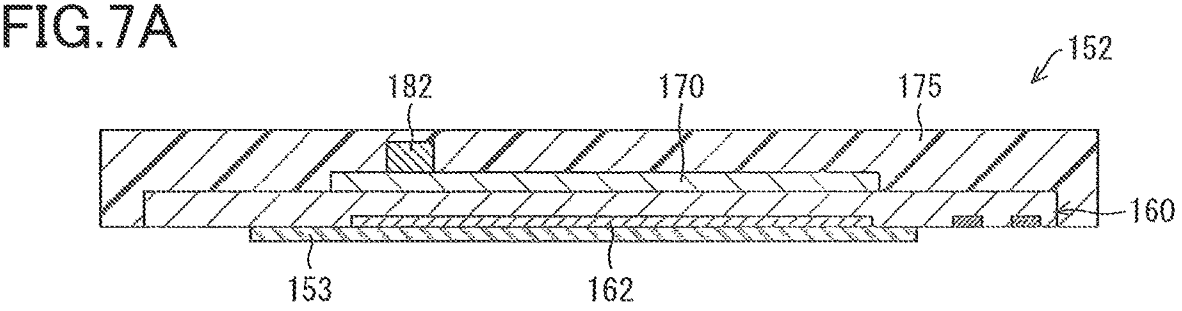
FIG. 7A is a side view illustrating a main configuration of a heating unit of a comparative example.
Figure 7B:
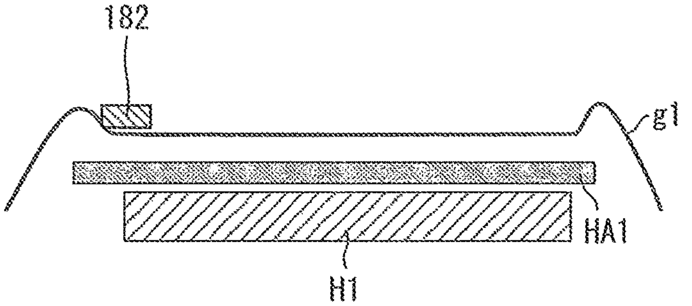
FIG. 7B is a view for explaining a temperature distribution in a fixing operation for a sheet with a maximum width of the comparative example.
Figure 7C:
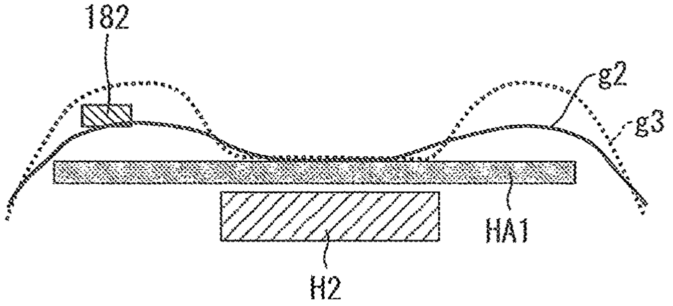
FIG. 7C is a view for explaining a temperature distribution in a fixing operation for a sheet with a minimum width of the comparative example.
Figure 8B:
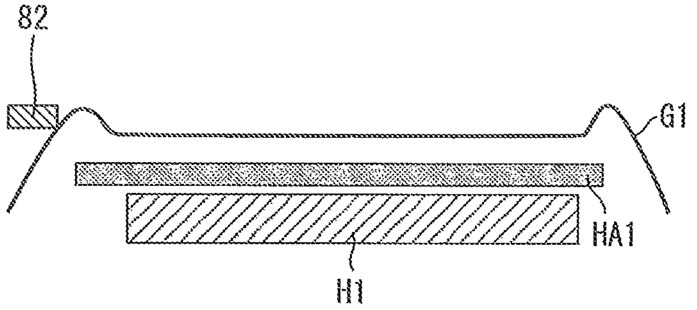
FIG. 8B is a view for explaining a temperature distribution in the fixing operation for the sheet with the maximum width in the present disclosure.
Figure 8C:
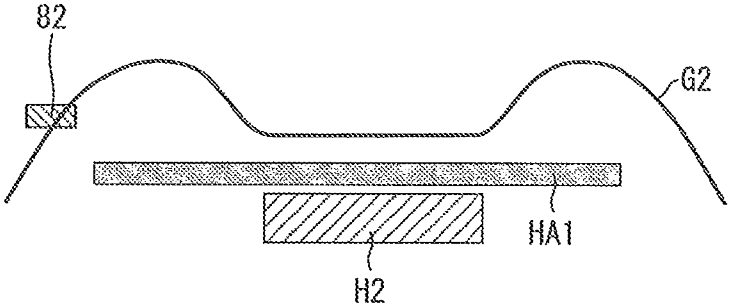
FIG. 8C is a view for explaining a temperature distribution in the fixing operation for the sheet with the minimum width in the present disclosure.

Here, there will be described effects of the fixing device 45 and the image forming apparatus 1 according to the present embodiment with reference to FIG. 7A to FIG. 8C. FIG. 7A is a side view illustrating a main configuration of a heating unit 152 of a comparative example, FIG. 7B is a view for explaining a temperature distribution in the fixing operation for a sheet with the maximum width in the comparative example, and FIG. 7C is a view for explaining a temperature distribution in the fixing operation for the sheet with the minimum width in the comparative example. FIG. 8A is a side view illustrating a main configuration of the heating unit 52 of the first embodiment, FIG. 8B is a view for explaining a temperature distribution in the fixing operation for the sheet S1 with the maximum width in the first embodiment, and FIG. 8C is a view for explaining a temperature distribution in the fixing operation for the sheet S1 with the minimum width in the first embodiment.

As illustrated in FIG. 7A, in the comparative example, a heating unit 152 includes a heater 160 having a resistance heating element 162, a holder 175, a belt 153, a metal sheet 170, and a temperature sensor 182 configured to detect a temperature at an end part of the heater 160 in a longitudinal direction of the heater 160 in a state in which the temperature sensor 182 is in contact with the metal sheet 170. In the comparative example, the temperature sensor 182 is disposed at a position within an area of the resistance heating element 162, not disposed at a position outside the area of the resistance heating element 162.

In the comparative example, as illustrated in FIG. 7B, in a case where the fixing operation is executed for the sheet S1 with the maximum width H1 usable in the heating unit 152, the dimension of the sheet S1 with the maximum width H1 in the longitudinal direction of the heater 160 is slightly less than a dimension of a heat-generating area HA1 of the resistance heating element 162 in the longitudinal direction of the heater 160. As a result of this, temperatures of the heater 160 at not-passing-areas which are located outside the area of the maximum width H1 are increased. Then, as illustrated in FIG. 7B, the temperature sensor 182 detects the temperatures of one of end parts of the heat-generating area HA1 of the resistance heating element 167 which is a temperature slightly increased from a temperature at a central part of the heat-generating-area HA1. As illustrated in FIG. 7B, it is noted that a graph indicating a temperature distribution of the heater 160 is represented by a waveform g1. The graph of the waveform g1 represents a relationship between positions of the heater 160 in the longitudinal direction of the heater 160 and temperatures of the heater 160. In FIG. 7B, the upper position on the waveform g1 represents a higher temperature than the lower position on the waveform g1. Above described relationship and explanations regarding the graph of the waveform g1 are applied to graphs of waveforms g2, g3, G1, and G2.

Moreover, in the comparative example, as illustrated in FIG. 7C, in a case where the fixing operation is executed for the sheet S1 with the minimum width H2 usable in the heating unit 152, the dimension of the sheet S1 with the minimum width H2 in the longitudinal direction of the heater 160 is less than the dimension of the maximum width H1 in the longitudinal direction of the heater 160 with respect to the heat-generating-area HA1 of the resistance heating element 162. In this case, each of dimensions of not-passing areas which are located outside the area of the minimum width H2 in the longitudinal direction of the heater 160 is larger than each of dimensions of the not-passing-areas outside the area of the maximum width H1 in the longitudinal direction of the heater 160. Accordingly, as illustrated in FIG. 7C, temperatures of the heater 160 at the not-passing-areas outside the area of the minimum width H2 are greatly increased.

As illustrated in FIG. 7C, in the comparative example, however, the temperatures of the heater 160 at the not-passing-areas outside the area of the minimum width H2 and the temperature at the central part of the heater 160, the temperature of which is relatively low temperature, are uniformed with each other by the metal sheet 170. Accordingly, as indicated by the graph of the waveform g2, the increase of the temperature distribution of the heater 160 at the not-passing-areas outside the area of the minimum width H2 is reduced, when compared with the graph of the waveform g3 indicating the temperature distribution in a case where the metal sheet 170 is not provided. That is, the temperatures at the not-passing-areas outside the area of the minimum width H2 is less increased than the case where the metal sheet 170 is not provided. Then, as illustrated in FIG. 7C, the temperature sensor 182 detects the temperature at the second end part of the heater 160 which is decreased by the temperature at the central part of the heater 160.

As described above, in the comparative example, in the case where the fixing operation is executed for the sheet S1 with the minimum width H2, the temperature sensor 182 detects the temperature which is lower than an actual temperature at the second end part of the sheet S1, as the temperature at the second end part of the heater 160. As a result of this, in the comparative example, it is hard to accurately detect the fixing temperature in the sheet S1 in the case where the fixing operation is executed for the sheet S1 with the minimum width H2.

Moreover, in the comparative example, in a case where the speed of printing is increased, the temperature of the heater 160 increases. Specifically, in the comparative example, in a case where the speed of printing for, for example, the sheet S1 with the minimum width H2 is increased, the temperature at the second end part of the heater 160 greatly increases as the speed of the printing becomes higher. As a result of this, in the comparative example, a degree of detecting accuracy of the temperature at the second end part of the heater 160 by the temperature sensor 182 decreases as the speed of printing becomes higher. Further, it is necessary to use the temperature sensor 182 having a higher heat-resisting property when the speed of printing becomes higher.

On the other hand, in the present embodiment, as illustrated in FIG. 8A, the heating unit 52 includes the heater 60 having the resistance heating element 62, the holder 75, the belt 53, the metal sheet 70 and the second temperature sensor 82 configured to detect the temperature at the second end part of the heater 60 in the longitudinal direction of the heater 60 in the state in which the second temperature sensor 82 is in contact with the metal sheet 70.

As illustrated in FIG. 8B, in the present embodiment, in the case where the fixing operation is executed for the sheet S1 with the maximum width H1 usable in the heating unit 52, the dimension of the sheet S1 with the maximum width H1 in the longitudinal direction of the heater 60 is slightly less than a dimension of the heat-generating area HA1 of the resistance heating element 62 in the longitudinal direction of the heater 60. As a result of this, the temperatures of the heater 60 at the not-passing-areas which are located outside the area of the maximum width H1 are increased. Further, since the resistance heating element 62 does not exist at areas outside the heat-generating area HA1, the temperatures of the heater 60 at the areas outside the heat-generating area HA1 are lower temperatures when compared with the temperature of the heater 60 at an area inside the heat-generating area HA1.

Accordingly, the temperature distribution of the heater 60 is indicated by a graph of a waveform G1. In this case, as illustrated in FIG. 8B, since the second temperature sensor 82 detects the temperature of the heater 60 at the position outside the area of the resistance heating element 62, it is not necessary to use the temperature sensor 82 having a higher heat-resisting property.

Moreover, in the present embodiment, as illustrated in FIG. 8C, in the case where the fixing operation is executed for the sheet S1 with the minimum width H2 usable in the heating unit 52, the dimension of the sheet S1 with the minimum width H2 in the longitudinal direction of the heater 60 is less than the dimension of the maximum width H1 in the longitudinal direction of the heater 60 with respect to the heat-generating area HA1 of the resistance heating element 62. As a result of this, each of dimensions of not-passing areas which are located outside the area of the minimum width H2 is larger than each of dimension of the not-passing-areas outside the area of the maximum width H1 in the longitudinal direction of the heater 60, and, as illustrated in FIG. 8C, temperatures of the heater 60 at the not-passing-areas outside the minimum width H2 are greatly increased. Moreover, since the resistance heating element 62 does not exist at the areas outside the heat-generating area HA1, the temperatures of the heater 60 at the areas outside the heat-generating area HA1 are lower temperatures when compared with the temperature of the heater 60 at the area inside the heat-generating area HA1.

Accordingly, the temperatures of the heater 60 at the not-passing-areas outside the area of the minimum width H2 and the temperature at the central part of the heater 60, the temperature of which is relatively low temperature, are uniformed with each other by the metal sheet 70. Accordingly, the temperature of the heater 60 at the not-passing-areas is slightly decreased. In this case, the temperature distribution of the heater 60 is illustrated by the graph of the waveform G2. Then, as illustrated in FIG. 8C, the second temperature sensor 82 detects the temperature at an area located outside the area of the resistance heating element 62. In a case where the second temperature sensor 82 is disposed at an area located inside the heat-generating area HA1, there is a possibility that the second detecting member 82 cannot detect an abnormal increase in temperature of the heater 60 due to a temperature difference between the temperature at the not-passing-areas and the temperature at a passing-area, and change of the temperature distribution of the heater 60. In the present embodiment, however, the second temperature sensor 82 detects the temperature of the heater 60 at the area outside the area of the resistance heating element 62. Accordingly, the temperature at the area outside the area of the resistance heating element 62 is not affected by the temperature difference between the not-passing areas and the passing-area, and the change of the temperature distribution of the heater 60, and it is possible to accurately detect the temperature at the second end part of the heater 60.

Moreover, in the present embodiment, since the second temperature sensor 82 is disposed at the area outside the area of the resistance heating element 62, different from the comparative example, it is possible to suppress a situation in which the degree of detecting accuracy of the temperature at the second end part of the heater 60 by the second temperature sensor 82 decreases as the speed of printing becomes higher. Further, it is possible to reduce cost by using the second temperature sensor 82 having a lower heat-resisting property.

Further, in the present embodiment, as illustrated in FIG. 8A, the second temperature sensor 82 is disposed in an area inside an area where the belt 53 is disposed in the longitudinal direction of the heater 60. In other words, the second temperature sensor 82 is disposed at a position between a first end and a second end of the belt 53 in the longitudinal direction of the heater 60. As a result of this, in the present embodiment, it is possible to bring the second temperature sensor 82 closer to the resistance heating element 62. Accordingly, it is possible to accurately detect the temperature of the heater 60 while suppressing adverse effect of the abnormal increase in temperature at the second end part of the heater 60 in the longitudinal direction of the heater 60.

SECOND EMBODIMENT

There will be described in details other embodiments of the present disclosure below. It is noted that the same reference numerals as used in the above described embodiment are used to designate the corresponding elements of the second embodiment, and an explanation of which is dispensed with.

Figure 9A:
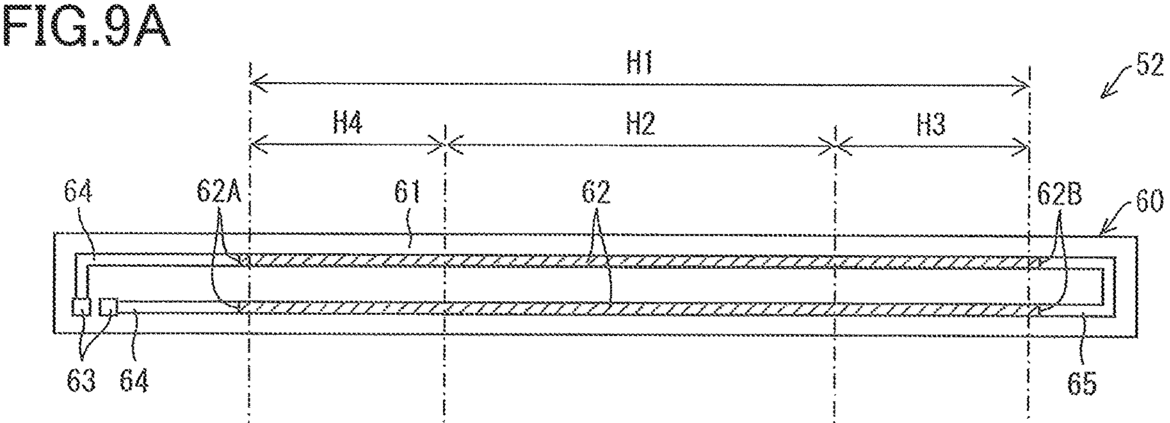
FIG. 9A is a plan view illustrating a heater of a heating unit provided for a fixing device of the present disclosure.
Figure 9B:
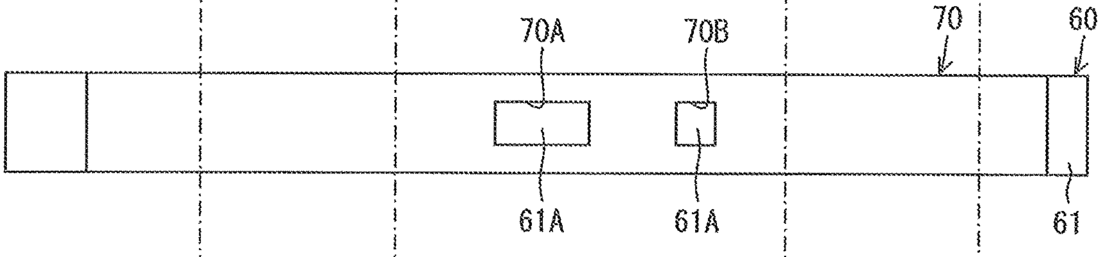
FIG. 9B is a plain view illustrating a metal sheet of the heating unit.
Figure 9C:
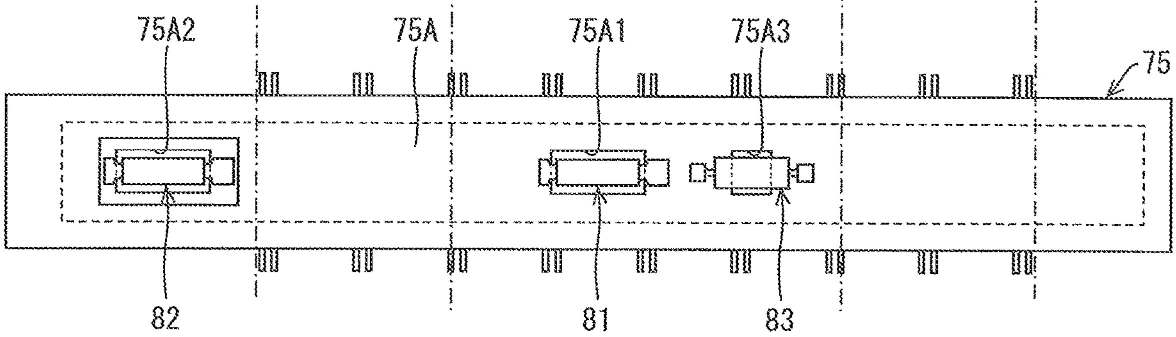
FIG. 9C is a plain view illustrating a first temperature sensor, a second temperature sensor and an thermostat of the heating unit.

FIG. 9A is a plan view illustrating a heater of a heating unit provided for a fixing device of a second embodiment of the present disclosure, FIG. 9B is a plain view illustrating a metal sheet of the heating unit, and FIG. 9C is a plain view illustrating a first temperature sensor, a second temperature sensor and a thermostat of the heating unit. In the figures, differences between the second embodiment and the first embodiment are that (i) the second temperature sensor 82 and the current-supply terminal 63 are disposed at the first end part of the heater 60 in the longitudinal direction of the heater 60, and (ii) the thermostat 83 is disposed at a position within an area where the sheet S1 with the minimum width H2 passes.

As illustrated in FIG. 9A and FIG. 9C, in the heating unit 52 of the second embodiment, the current-supply terminal 63 and the second temperature sensor 82 are disposed at the first end part of the heater 60 in the longitudinal direction of the heater 60. In other words, the current-supply terminal 63 is disposed at a position located between the first end of the substrate 61 in the longitudinal direction of the heater 60 and the first end of the resistance heating element 62 in the longitudinal direction of the heater 60, and the second temperature sensor 82 is disposed at a position located between the first end of the substrate 61 in the longitudinal direction of the heater 60 and the first end of the resistance heating element 62 in the longitudinal direction of the heater 60. Moreover, as illustrated in FIG. 9C, the thermostat 83 is disposed at the position within the area where the sheet S1 with the minimum width H2 passes.

According to the above described configuration, the same effects as the first embodiment can be achieved in the second embodiment. Moreover, in the second embodiment, since the second temperature sensor 82 is disposed at the first end part, which is the same position as the current-supply terminal 63, of the heater 60 in the longitudinal direction of the heater 60, an electrical wire connected to the second temperature sensor 82 and an electric wire connected to the current-supply terminal 63 can be provided at the same first end part of the heater 60. As a result of this, in the second embodiment, workability such as routing and arranging the electric wires is improved, and it is possible to easily simplify the manufacture of the fixing device 45.

Moreover, in the second embodiment, since the thermostat 83 is disposed at the position located within the area where the sheet S1 with the minimum width H2 passes, in the case where the heater 60 is abnormally increased in temperature, it is possible to interrupt the energization to the resistance heating element 62 by the thermostat 83 regardless of the dimension of the sheet S1 in the width direction.

According to the above described explanation, it is noted that the configurations in which the metal sheet 70 is disposed between the heater 60 and the holder 75, and the second temperature sensor 82 is in contact with the metal sheet 70 are explained, however, the present disclosure is not limited to the above described configurations. The metal sheet 70 may be omitted from the heating unit 52 and the second temperature sensor 82 may be in contact with the back surface 61A of the substrate 61.

Moreover, in the above described explanation, the configuration in which the single metal sheet 70 is disposed between the heater 60 and the holder 75 is explained, however, the present disclosure is not limited to the configuration. For example, two metal sheets which are respectively in contact with the first temperature sensor 81 and the second temperature sensor 82 individually may be provided for the heating unit 52.

While the embodiment has been described above, it is to be understood that the disclosure is not limited to the details of the illustrated embodiment, but may be embodied with various changes, modifications and combinations, which may occur to those skilled in the art, without departing from the spirit and scope of the disclosure. The combinations obtained by the technical configurations disclosed in the embodiments are includes in the present disclosure.

What is claimed is:

1. A fixing device, comprising:

a heater including a substrate and a resistance heating element disposed on the substrate, the substrate including a first end and a second end in a longitudinal direction of the heater, the resistance heating element including a first end and a second end in the longitudinal direction, the first end of the resistance heating element being the nearest end of the resistance heating element to the first end of the substrate in the longitudinal direction, the second end of the resistance heating element being the nearest end of the resistance heating element to the second end of the substrate in the longitudinal direction;

an endless belt configured to rotate around the heater, a first temperature sensor disposed at a position opposed to the heater and configured to detect a temperature at a center part of the heater in the longitudinal direction of the heater; and a second temperature sensor disposed at a position opposed to the heater and configured to detect a temperature at an end part of the heater in the longitudinal direction of the heater, the second temperature sensor including a first end and a second end in the longitudinal direction, wherein both of the first end and the second end of the second temperature sensor are located on an outer side of an area in which a maximum width of a largest possible sheet that can be used in the fixing device passes in the longitudinal direction of the heater, and wherein both of the first end and the second end of the second temperature sensor are disposed at a position located between the first end of the substrate in the longitudinal direction of the heater and the first end of the resistance heating element in the longitudinal direction of the heater or a position located between the second end of the substrate in the longitudinal direction of the heater and the second end of the resistance heating element in the longitudinal direction of the heater.

2. The fixing device according to claim 1, wherein the second temperature sensor is located at a position within an area where the endless belt is provided in the longitudinal direction of the heater.

3. The fixing device according to claim 1, wherein the second temperature sensor is disposed at a position between a first end and a second end of the endless belt in the longitudinal direction of the heater.

4. The fixing device according to claim 1, further comprising:

a holder holding the heater; and a metal sheet disposed between the heater and the holder, wherein the second temperature sensor is in contact with the metal sheet.

5. The fixing device according to claim 1, wherein the heater includes a current-supply-terminal disposed at a first end part of the heater in the longitudinal direction of the heater close to a first end of the substrate in the longitudinal direction of the heater and connected to the resistance heating element, and the current-supply terminal is not disposed at a second end part of the heater in the longitudinal direction of the heater, and wherein the second temperature sensor is disposed at a second end part of the heater in the longitudinal direction of the heater closer to a second end of the substrate than the first end of the substrate in the longitudinal direction of the heater.

6. The fixing device according to claim 1, wherein the heater includes a current-supply-terminal disposed at a position located between a first end of the substrate in the longitudinal direction of the heater and the first end of the resistance heating element in the longitudinal direction of the heater.

7. The fixing device according to claim 1, wherein the heater includes a current-supply-terminal disposed at a first end part of the heater closer to a first end of the substrate than a second end of the substrate in the longitudinal direction of the heater and connected to the resistance heating element, and wherein the second temperature sensor is disposed at the first end part of the substrate in the longitudinal direction of the heater.

8. The fixing device according to claim 1, wherein the heater includes a current-supply-terminal disposed at a position located between a first end of the substrate in the longitudinal direction of the heater and a first end of the resistance heating element in the longitudinal direction of the heater.

9. The fixing device according to claim 1, further comprising a thermostat configured to interrupt energization to the resistance heating element when the heater is abnormally increased in temperature, wherein the thermostat is disposed at a position within an area in which a minimum width of a smallest possible sheet that can be used in the fixing device passes in the longitudinal direction of the heater.

10. The fixing device according to claim 1, further comprising a thermostat configured to interrupt energization to the resistance heating element when the heater is abnormally increased in temperature, wherein the thermostat is disposed at a first end part of the heater closer to a first end of the substrate than a second end of the substrate in the longitudinal direction of the heater.

11. The fixing device according to claim 1, further comprising a thermostat configured to interrupt energization to the resistance heating element when the heater is abnormally increased in temperature, wherein the thermostat is disposed at a position located between a first end of the substrate in the longitudinal direction of the heater and a first end of the resistance heating element in the longitudinal direction of the heater.

12. The fixing device according to claim 1, wherein a dimension of the resistance heating element is greater than the area in which the maximum width of the largest possible sheet that can be used in the fixing device passes in the longitudinal direction of the heater.

13. The fixing device according to claim 1, wherein both of the first end and second end of the second temperature sensor are located on an outer side of the resistance heating element in the longitudinal direction of the heater.

14. The fixing device according to claim 1, wherein the first end and the second end of the resistance heating element are ends of the resistance heating element that generates heat when a fixing operation for the maximum width of the largest possible sheet of the fixing device is executed.

15. An image forming apparatus comprising a fixing device, the fixing device including:

a heater including a substrate and a resistance heating element disposed on the substrate, the substrate including a first end and a second end in a longitudinal direction of the heater, the resistance heating element including a first end and a second end in the longitudinal direction, the first end of the resistance heating element being the nearest end of the resistance heating element to the first end of the substrate in the longitudinal direction, the second end of the resistance heating element being the nearest end of the resistance heating element to the second end of the substrate in the longitudinal direction;

an endless belt configured to rotate around the heater, a first temperature sensor disposed at a position opposed to the heater and configured to detect a temperature at a center part of the heater in the longitudinal direction of the heater; and a second temperature sensor disposed at a position opposed to the heater and configured to detect a temperature at an end part of the heater in the longitudinal direction of the heater, the second temperature sensor including a first end and second end in the longitudinal direction, wherein both of the first end and the second end of the second temperature sensor are located on an outer side of an area in which a maximum width of the largest possible sheet that can be used in the fixing device passes in the longitudinal direction of the heater, and wherein both of the first end and the second end of the second temperature sensor are disposed at a position located between the first end of the substrate in the longitudinal direction of the heater and the first end of the resistance heating element in the longitudinal direction of the heater or a position located between the second end of the substrate in the longitudinal direction of the heater and the second end of the resistance heating element in the longitudinal direction of the heater.

16. The image forming apparatus according to claim 15, wherein a dimension of the resistance heating element is greater than the area in which the maximum width of the largest possible sheet that can be used in the fixing device passes in the longitudinal direction of the heater.

17. The image forming apparatus according to claim 15, wherein both of the first end and the second end of the second temperature sensor are located on an outer side of the resistance heating element in the longitudinal direction of the heater.

18. The image forming apparatus according to claim 15, wherein the first end and the second end of the resistance heating element are ends of the resistance heating element that generates heat when a fixing operation for the maximum width of the largest possible sheet of the fixing device is executed.

* * * * *